Figure 1:
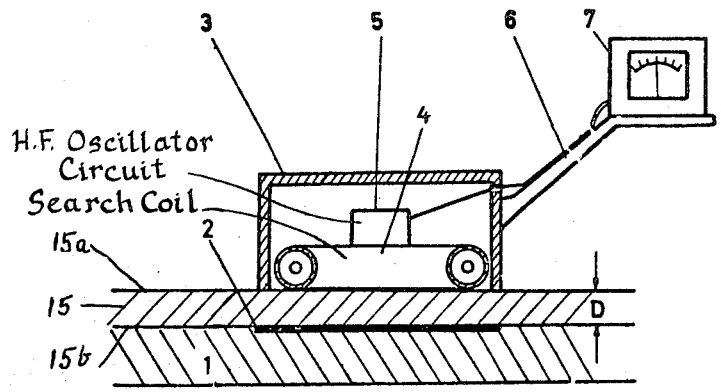

United States Patent [19]

Nix et al.

[11] 3,815,016

[45] June 4, 1974

[54] METHOD OF MEASURING THICKNESS OF NONMETALLIC PAVING MATERIAL WITH COMPENSATION FOR PROPERTIES OF THE MATERIAL

[76] Inventors: Hans Nix, Geranienweg 20, 5 Cologne Seeberg; Werner Koob, Dagobert str. 17, 5 Cologne, both of Germany

[22] Filed: Oct. 8, 1971

[21] Appl. No.: 187,678

[30] Foreign Application Priority Data
Oct. 12, 1970 Germany............................ 2049976

[52] U.S. Cl. ......................................... 324/34 TK
[51] Int. Cl. ........................................... G01r 33/00
[58] Field of Search ......... 324/34 R, 34 TK, 40, 41, 324/3

[56] References Cited
UNITED STATES PATENTS
2,581,394  1/1952  Dinger ........................... 324/34 TK
2,665,333  1/1954  Dunipace et al. .............. 324/34 TK
2,874,349  2/1959  Staats ................................... 324/41
3,662,225  5/1972  Garrett ................................. 324/3

OTHER PUBLICATIONS

Clarke et al.; "Electronic Locator for Salvaging Trolley Rails", Electronics, Jan. 1944, p. 129.

Primary Examiner—Robert J. Corcoran

[57] ABSTRACT

A method and apparatus for nondestructively measuring the thickness of a non-metallic layer, or wall, which utilizes a metallic sheet-like structure placed in the plane of one surface of the layer, or wall, so that apparatus to propagate an electromagnetic radiation field can be positioned against the opposite surface of the layer, or wall, and the thickness determined as a function of changes in the radiation field caused by changes in the distance between the source of the field and the metallic structure; the apparatus being calibrated remotely from the location of the metallic structure by utilizing a second metallic structure and observing the effects when positioned at known distances from the radiation field.

4 Claims, 2 Drawing Figures

METHOD OF MEASURING THICKNESS OF NONMETALLIC PAVING MATERIAL WITH COMPENSATION FOR PROPERTIES OF THE MATERIAL

The invention relates to a method for measuring the thickness of layers and walls for construction purposes by means of an electromagnetic high frequency gauge, which consists in measuring the distance from the gauge to a metallic reflector located underneath the layer to be measured.

In already known methods of this type the high frequency gauge comprises a search coil which is connected to a high frequency generator. When the gauge approaches to a metal portion it is influenced by this metal portion, so that the degree of the influencing effect can be used as a measure of distance between the gauge and the metal portion. It is already known, for example in road construction, to arrange metal portions which will be subsequently called "reflectors" underneath the different covering layers, and to measure the distance to the reflector by means of a high frequency gauge and after the application of each layer. For this operation the sensitivity of the indicating instrument must be adjusted to a correct value which has been measured by independent mechanical means. Since the layer has to be destroyed for this purpose, in order to expose the test plate, the durability of this layer is considerably impaired.

This drawback can be avoided by means of the present invention which refers to a method for measuring the thickness of layers and walls for construction purposes by means of an electromagnetic high frequency gauge which measures the distance of the gauge from a metallic reflector located underneath, or behind, the layer which is to be measured. According to the invention, the influence of the magnetic and electric properties of the material forming the layer to be measured is eliminated while the gauge is positioned over a portion of the layer which is remote from the reflector.

This makes it possible in a simple manner, to avoid influencing the high frequency gauge by the components of the layer being measured since such influence varies considerably depending upon the composition of the layers.

A particularly simple method, according to the invention, consists in carrying out the sensitivity adjustment of the indicating instrument by means of an additional calibrating reflector while the gauge is positioned over a portion of the layer which is remote from a first reflector attached to the layer. The adjustment is accomplished while the calibration reflector is arranged at a certain predetermined distance above the high frequency gauge.

Figure 2:
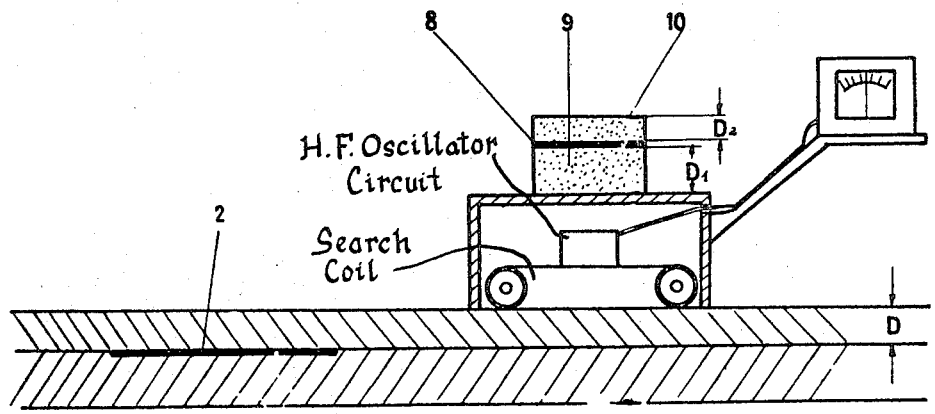

The invention will be subsequently described in more detail, with relation to the accompanying drawings, in which FIGS. 1 and 2 are sectional views of a particular embodiment thereof, in which the device is shown in position for measuring thickness in FIG. 1, and in position for calibration in FIG. 2.

In FIG. 1 the thickness of the layer 15, which is to be measured, is indicated by reference letter D. Arranged on top of a supporting base 1 which defines one face 15b of the layer 15 is a measuring reflector 2 of negligible thickness. The measuring gauge 3, comprises a search coil 4 having a single ring of solid wrapped cable, shown in measuring position located over the measuring reflector. The search coil 4 is connected with a high frequency oscillating circuit 5, of any conventional design and the gauge is further provided with a handle 6 and an indicating instrument 7 which measures values of the oscillating circuit 5 as a function of the thickness D.

FIG. 2 shows how to accomplish the adjustment according to the invention. The measuring gauge is located on top of a portion of the layer D to be measured, under which there is no reflector. A calibration reflector 8 is positioned on top of the measuring gauge and is provided with two layers 9 and 10 of different thicknesses D1 and D2, respectively, attached to its respective sides. First, the indicating instrument is adjusted to a value of infinity, without using the calibration reflector. Thereafter, the calibration reflector is positioned as shown in FIG. 2, and the instrument is adjusted to a value corresponding to D1. Finally, the calibration reflector is inverted and the instrument is adjusted to a value corresponding to D2. Since the calibration reflector and the measuring reflector 2, can have different sizes and different electromagnetic values, respectively, D1 and D2 need not be identical with the corresponding thicknesses of the layers to be measured.

Preferably, the calibration reflector 8 comprises a metal element, for example a metal sheet, a plate, a wire ring or a wire cloth screen, which is provided on both sides with a material of different thicknesses and not influencing the measurement. By inverting the calibration reflector 8 positioned on top of the high frequency gauge 3 the values of the measurement device 7 can easily be accomplished at two values of the used measuring range.

Of course, the electrical and magnetical properties of the calibration reflector 8 must be calculated in such a way that the effect of the measuring reflector 2, through the layer D to be measured, is exactly reproduced. The same considerations must be taken into account to determine the dimensions of the reflector 8, and it is for this reason that the two reflectors need not have have the same dimensions and electromagnetic values as stated above.

The reflector used in the method of the invention, which is to be positioned underneath or behind the layer to be measured, comprises a metal sheet, a plate or preferably a wire mesh, whereby the intersections of the wires are electrically connected with each other, preferably by soldering. This reflector is conveniently bonded to the support base prior to the application of the layer to be measured.

The high frequency gauge used in the method of the invention comprises a search coil which is surrounded by a tubular conductor electrically connected to the neutral point of the oscillator circuit 5. According to an advantageous embodiment the search coil comprises a circular solid wrapped coaxial cable and has a diameter exceeding half the thickness of the layer to be measured. It is convenient that the turns of the search coil be arranged generally in a single plane, with the outer wire preferably formed in a helix.

According to the invention a measuring frequency of more than 2 megahertz is used in the method for measuring the thickness of layers for construction purposes; at this high frequency the adjustment of the sensitivity by means of the calibration reflector, over a portion of the layer to be measured which is remote from the measuring reflector, can be achieved in a particularly simple way.

An advantageous apparatus to carry out the method of the invention comprises a movable support such as a housing 3 in which the high frequency gauge is mounted, so that the gauge may be suspended at a slight distance above the surface of the layer to be measured and lowered onto the surface of this layer over the reflector 2 after the minimum of the indicated layer thickness has been determined.

In addition to measuring layer thicknesses the method and apparatus of the invention can also be used to search metal particles in the ground, under layers and in or behind walls.

What is claimed is:

1. Method of nondestructively measuring the thickness of a layer of essentially non-metallic building construction or paving material, comprising the steps of placing a first reflector of metallic material in contact with one surface of said layer at the location where said measuring is to be done, connecting a search coil and an indicating instrument in a circuit with the source of electrical energy to generate a high frequency electromagnetic field associated with said search coil, measuring the influence of the magnetic and electrical properties of said layer on said search coil as indicated by said indication instrument when the search coil is placed over a portion of the layer remote from said first reflector of metallic material and eliminating said influence by adjusting said circuit until the indicating instrument indicates a predetermined electrical value, then placing the search coil adjacent said measuring location and measuring said thickness.

2. The method as claimed in claim 1, including the calibration step of placing a second reflector of metallic material in the high frequency electromagnetic field of said search coil and at a predetermined distance from the search coil while in said remote location, adjusting said circuit until the indication of the instrument corresponds to an electrical value corresponding to the distance of said second reflector from the search coil, removing said second reflector and placing said search coil on said layer to be measured and at the location of said first reflector of metallic material to obtain an indication from said indicating instrument corresponding to the thickness of said layer.

3. The method of claim 2, wherein said calibration step includes the steps of positioning said second reflector at at least two different distances from said search coil to obtain two different electrical values corresponding to said two distances.

4. The method of claim 3, which includes the steps of operating said source of electrical energy at a frequency of at least 2 megahertz.

* * * * *